June 13, 1961
W. M. OSBORN
2,988,589
BATTERY CAP
Filed Oct. 2, 1958
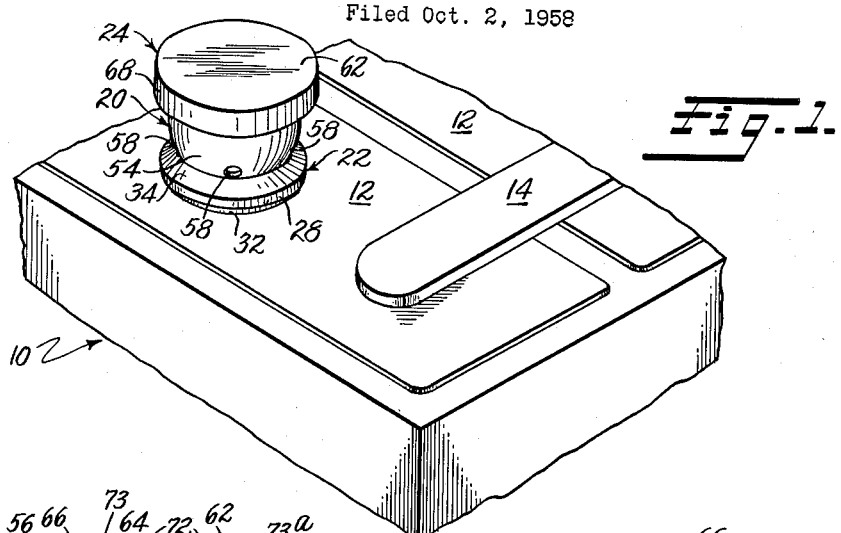
Fig. 1.
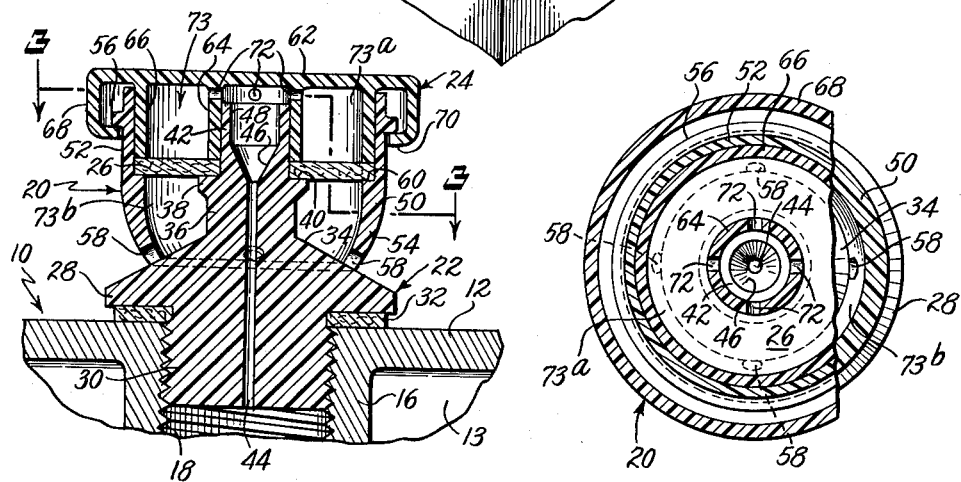
Fig. 2.
Fig. 3.
INVENTOR.
William M. Osborn
BY
Bacon & Thomas
ATTORNEYS

United States Patent Office 2,988,589
Patented June 13, 1961

2,988,589
BATTERY CAP
William M. Osborn, 3349 Zuni St., Denver, Colo.
Filed Oct. 2, 1958, Ser. No. 764,981
12 Claims. (Cl. 136—179)

This invention relates to caps for storage batteries, and more specifically to a cap including novel means to reduce the loss of liquid and to render harmless any gases escaping from a storage battery.

The conventional storage batteries, such as used in automobiles or in stationary power plants, are usually of the so-called acid type, employing cast lead-antimony alloy grids which function as plates for lead oxide constituting the active material for the positive electrode. Such batteries usually comprise a number of separate cells which are electrically connected, each cell containing acid, and having a removable closure cap for replacing the liquid lost from the cell. In the normal operation of these batteries, involving frequent charging and discharging, various gases are formed within the cells, some of which gases are harmful to various elements with which they may come into contact. It is customary, in such batteries, to provide small vent openings in the closure caps to permit the escape of such gases to the atmosphere. In the use in automobiles, for instance, where the batteries are usually placed under the hood, the gases do not readily escape, but can circulate about the engine and accessories before passing to the atmosphere. Such gases, coming into contact with the battery cable and ground connection, with battery terminals and/or battery support and hold-down frame, cause objectionable corrosion, and eventually bring about a condition requiring a cleaning of the battery terminal posts, etc., in order to permit the flow of sufficient current to meet the electrical demands such as starting, lights, etc. Electrical generators, usually located under the hood, are provided with fans to circulate air over various parts thereof, including the windings, to dissipate heat. The fans frequently circulate the gases discharged from the storage battery, which come into contact with the brushes and/or commutator of the generator, causing corrosion and reducing the life of the generator. It is not unusual for the acid from the battery to be lost through the vent openings as the result of splashing of the liquid. Such acid is also harmful when it comes into contact with various engine parts or other elements.

It is an object of the invention, therefore, to provide a novel battery cap, which can replace the conventional battery cap equipped with vent openings, such novel caps including means to render the escaping gases harmless before discharging to atmosphere.

It is another object of the invention to provide a novel battery cap including means to separate the gas and liquid escaping from a storage battery, and to return the liquid to the battery.

It is a further object of the invention to provide a novel battery cap having a chemically treated porous element through which the gases are directed to pass, which element is readily accessible and easily removable for replacement.

Another object of the invention is to provide a battery cap which will prevent the escape of harmful gases and liquids in an efficient manner but which is extremely simple in design and construction and is readily and economically manufactured.

It is a still further object of the invention to provide a novel battery cap having a replaceable chemically-treated porous element and a cooperating cap closure element which retains the porous chemically-treated element in position and directs gases in reverse flow downwardly therethrough.

Other further objects and advantages of the invention will be apparent from a consideration of the following description and accompanying drawing, wherein:

FIG. 1 is an isometric view showing the battery cap of the invention in position in an opening in a cell of a battery;

FIG 2 is a vertical sectional view of one embodiment of the invention; and

FIG. 3 is a horizontal sectional view along the line 3—3 of FIG. 2.

Referring to the drawings and first, particularly, to FIG. 1, there is shown a portion of a storage battery 10 including a plurality of separate cells 13 (FIG. 2), each having a cover plate 12, of which only two are shown. It is to be understood that a battery can include any number of separate cells, which are electrically interconnected by means of conductors 14, and that each cell cover plate 12 is provided with one or more threaded openings 18 (FIG. 2), in a depending flange 16, for the addition of make-up liquid and to obtain access to the cell 13 for testing or inspection.

As shown in FIGS. 2 and 3, the battery cap in its entirety is designated by the reference numeral 20, and comprises the following parts: a body part 22, a cap or top portion 24, and a chemically-treated porous element 26.

The body part 22 may be made of a suitable acid resistant and electrical non-conducting material such as hard rubber, Bakelite, or any other suitable plastic material, and comprises a base 28 from which depends an externally threaded plug 30 adapted to be screwed into the opening 18 of the battery cell. A gasket 32 is placed about the plug 30 between the base 28 and the upper surface of cell 12 to prevent the escape of liquid and gases around the plug.

The upper surface of the base 28 is shaped in the form of the frustum of a cone, as shown at 34, which continues upward at its center to form a tubular extension having a lower part 36 terminating in an outwardly flanged portion 38. The lower part 36 integrally joins an upper extension 42 of reduced cross-section, the flanged portion 38 meeting extension 42 to form an external shoulder 40.

A bore 44 extends axially through the body part 22. The bore 44 is of substantially constant diameter throughout most of its length, and joins by means of tapered section 46 an upper bore 48 of greatly increased cross-section. It can be seen that the bore 44, tapering section 46, and bore 48 provide a vent for the escape of gases formed within the cell 13 of the battery.

The body part 22 also includes a generally cup-shaped outer annular sleeve 50 formed integrally with the frusto-conical surface 34. The upper part of sleeve 50 is substantially cylindrical, as shown at 52, while the lower end of the sleeve 50 is of generally inwardly tapering form as shown at 54, having its smallest diameter at its intersection with base 28. A plurality of vent openings 58 are provided in the lower part 54 of sleeve 50 for exit of treated gases from the battery as will be further described below. The inner periphery of the upper part 52 of sleeve 50 has a greater diameter than the lower part, such portion of increased diameter terminating abruptly at an inner shoulder 60 positioned at the same level as the shoulder 40 on the extension 36 of the body part 22. The shoulders 40 and 60 form a supporting means for a replaceable chemically-treated porous element 26 of annular configuration, as clearly shown in FIG. 2. Spaced slightly below the upper end of the upper part 52 of sleeve 50, on the exterior thereof, is a bead 56, which may extend part way around, or entirely around the sleeve. The bead 56 serves as a means to lock the cap 24 in position, as will be made clear hereinafter.

The cap 24 is made of a resilient plastic material, such as soft rubber, polyethylene, or any other non-corrosive material having resilient characteristics, and comprises a top portion 62 of flat, disk, form, having an inner depending annular skirt 64, an intermediate concentric depending skirt 66, and an outer concentric depending skirt 68. The inner diameter of the inner skirt 64 corresponds to the outer diameter of extension 42, and the outer diameter of the intermediate skirt 66 corresponds to the interior diameter of the upper end 52 of sleeve 50, so that, when the cap 24 is placed over the body part 20, as shown in the drawing, the skirt 64 and extension 42, and the skirt 66 and the upper end 52, respectively, engage in close-fitting telescopic relation forming a seal to prevent escape of gases around the cap 24.

The lower end of the outer skirt 68 is provided with an inturned flange 70 which is adapted to extend below the bead 56 when the cap 24 is positioned on the body part 22 as shown.

It should be observed that the upper end of the inner extension 42 is at a slightly lower level than the top of upper end 52 of the outer sleeve 50, so that, when the cap 24 is positioned on the body part 22 as shown, there will exist a slight space between the upper end of extension 42 and the bottom surface of the top portion 62 of cap 24. A plurality of radial openings 72 are provided in the skirt 64 adjacent said space, which openings form a means of communication between the bore 46 and the annular chamber surrounding the body part 22.

From the construction above described, it may be seen that an annular chamber 73 is formed, having an inner wall comprising skirt 64, flange 38, and extension 36, an outer wall comprising skirt 66, and portion 54 of sleeve 50, an upper wall comprising the bottom of top 62, and a sloping bottom wall, comprising the frusto-conical surface 34. The chemically treated porous element 26 extending transversely of the chamber 73 divides said chamber into an upper section 73a having inlet apertures 72, and a lower section 73b communicating with the atmosphere by the vents 58.

The chemically treated porous element 26 is ring-shaped in form and has a section sufficient to bridge the distance between the shoulders 40 and 60. The element 26 may be made of felt, and treated with appropriate chemicals to neutralize and render innocuous the gases and vapors escaping from the battery cells. Non-limiting examples of such chemicals may be a sodium carbonate, sodium bicarbonate, or sodium hyposulfite solutions, with which the felt element 26 may be saturated. If desired, several felts saturated with the same or with different solutions may be used.

The parts may be assembled as follows: The gasket 32 is placed around the plug 30, and the plug is screwed tightly into the threaded opening 18. A felt ring 26, saturated with an appropriate chemical solution, is placed in the annular chamber 73 on shoulders 40 and 60, whereupon the cap 24 is positioned on body member 22 with the skirt 64 surrounding extension 42 and skirt 66 within upper end 52 of sleeve 50. By applying pressure to the top 62 of the cap 24, the skirt 68 will spread to enable the flange 70 thereon to pass over the bead 56, whereupon the resilient characteristics of the cap 24 will cause the flange 70 to snap into position below the bead 56, thereby locking the cap 24 in position. It should be noted that the skirts 64 and 66 have the same length, and are related to the length of skirt 68 so that, when the flange 70 resiliently engages the lower surface of the bead 56, the lower ends of the skirts 64 and 66 will firmly engage the upper surface of the porous element 26, whereby the edges of the porous element 26 will be gripped between the lower ends of the skirts 64 and 66 on the one hand, and the shoulders 40 and 60 on the other hand, to firmly retain the element in its transverse position across the annular chamber 73 so that all gases from the battery must pass through such element.

In operation, any gases formed in the cell 13 will pass upward through the bore 44, tapered section 46, bore 48, out through apertures 72, and downward through upper section 73a of annular chamber 73, porous element 26, and into the lower section 73b. The gases and any liquid entrained therein will be neutralized and made innocuous by the chemicals in the element 26, and the harmless gases can escape to atmosphere by way of the vents 58. It will be noted that the floor 34 of annular chamber 73 slopes toward the vents 58, so that should any liquid condense in the chamber, the condensate can flow down the surface onto the cover plate 12, where the harmless liquid can evaporate.

In the case of use in vehicles, where the movement of the vehicle causes the liquid in the battery cell to splash about, it is possible that some liquid drops may be thrown up into the bore 44 and carried upward by the gases. When such liquid drops and gases reach the enlarged bore 48, there will be a separation of the liquid and gases, and the liquid will be free to run down the tapering section 46 and 44 and return to the cell. Most of the vapors normally entrained with the gases from the battery will also be condensed in enlarged bore 48 and returned to the battery. Thus, the enlarged chamber plus the reverse flow of the gases at the top of their travel through the device ensures retention of substantially all liquid within the battery.

When it is desired to replace the porous element 26, the cap 24 can be unlocked by placing the fingers below the flanges 70 and forcing upward thereon. The flange 70 and skirt 68 will easily spread to permit the flange 70 to ride upward over the bead 56 and the cap 24 can be removed. By means of a pair of tweezers, or by means of any pointed tool, the porous element 26 can be easily and quickly removed and a new element inserted in its place, whereupon the cap can be readily replaced and snapped in locked position, which action also retains the new porous element against movement in the annular channel 73.

From the foregoing, it is evident that I have devised a battery cap ensemble that can be manufactured economically from relatively cheap materials, that performs the function of chemically treating waste gases, in an efficient manner, and which lends itself to easy and quick replacement of the element effecting chemical treatment.

It is understood that the device is capable of many modifications in structure and design, without departing from the spirit of the invention, within the scope of the appended claims.

I claim:

1. A battery cap apparatus comprising: a plug adapted to be fitted within an opening in a battery, said plug having an axial extension with a bore extending through said plug and extension, said plug having an axial extension with a bore extending through said plug and extension, said plug having an upstanding sleeve forming a wall spaced from said extension, said sleeve being concentric with said axial extension, an upper edge of said sleeve projecting slightly beyond an upper edge of said extension, providing an annular chamber surrounding said axial extension, said sleeve having apertures to connect the lower part of the annular chamber to the atmosphere, said extension and said sleeve having opposed shoulders above said apertures and spaced from the bottom of said annular chamber; chemically treated porous ring means disposed in said annular chamber and supported on said shoulders; and removable cap means closing the upper end of said bore and annular chamber for directing gases escaping from the top of said bore downwardly through said chemically treated means and into the atmosphere through said apertures.

2. A battery cap apparatus as defined in claim 1, in which the upper end of the bore is of greater diameter than the lower end to provide an expansion chamber to facilitate separation and return of any liquid carried by gases escaping from the battery.

3. A battery cap apparatus as defined in claim 1, in which the cap portion includes downwardly depending means engaging upper peripheral edges of said chemically-treated means for holding said chemically-treated means in position against said shoulders within said annular chamber.

4. A battery cap apparatus as defined in claim 3, in which said downwardly depending means includes a pair of concentric skirts telescopically interfitting with said extension and said upstanding sleeve to retain the cap portion in position on the plug.

5. A battery cap apparatus as defined in claim 4, including a plurality of openings in the inner one of said concentric skirts to provide communication between said axial bore and said annular chamber.

6. A battery cap apparatus as defined in claim 3, in which said annular sleeve includes an external flange, and said cap portion includes a ring shaped member to engage said flange to lock said cap portion on said plug.

7. A battery cap apparatus as defined in claim 6, in which said ring shaped member comprises a depending skirt having an internal flange adapted to interlock with the external flange.

8. A battery cap apparatus as defined in claim 7, in which said cap portion and said depending skirt are made of resilient material, permitting said depending skirt to spread and said internal flange thereon to pass the external flange on said annular sleeve on the plug.

9. A battery cap apparatus comprising: a body part having a base, the upper surface of said base forming a truncated cone, the lower surface of said base including a plug adapted to be fitted within an opening in the battery, the upper end of said truncated cone including a tubular extension having an abrupt reduction in diameter along the length thereof to form an external shoulder spaced from said base, an axial bore extending through said base, plug, and tubular extension; an annular sleeve connected to said base and extending upwardly in spaced relation to said tubular extension to provide an annular chamber, the upper surface of said truncated cone defining a bottom wall of said chamber; the inner wall of said annular sleeve having an abrupt change in diameter to provide a shoulder positioned adjacent said shoulder on the tubular extension in spaced relation with said bottom wall; a closure cap including a base and inner and outer concentric depending skirts, the inner of said skirts telescopically fitting about the upper end of said tubular extension and the outer of said skirts telescopically fitting inside the upper end of said annular sleeve; and an annular ring of chemically-treated porous material disposed on said adjacent shoulders, the lower ends of said skirts engaging the inner and outer upper peripheral edges of said annular ring to thereby retain said ring between said skirts and said shoulders in transverse relation across said annular chamber.

10. A battery cap apparatus as defined in claim 9, including openings in the inner skirt to provide communication between the axial bore and the annular chamber.

11. A battery cap apparatus as defined in claim 9, including vent openings to the atmosphere from said annular chamber communicating with the bottom of said chamber below said annular ring.

12. A battery cap apparatus as defined in claim 9, in which said annular sleeve has a gradually reducing diameter at its lower end.

References Cited in the file of this patent

UNITED STATES PATENTS

| | | |
|---|---|---|
| 1,130,977 | Hutchinson | Mar. 9, 1915 |
| 2,219,134 | Clercq et al. | Oct. 22, 1940 |
| 2,436,465 | Wilson | Feb. 24, 1948 |

FOREIGN PATENTS

| | | |
|---|---|---|
| 1,078,964 | France | Nov. 24, 1954 |
| 880,458 | Germany | June 22, 1953 |